United States Patent
Kehlet et al.

[11] Patent Number: 5,956,046
[45] Date of Patent: Sep. 21, 1999

[54] SCENE SYNCHRONIZATION OF MULTIPLE COMPUTER DISPLAYS

[75] Inventors: David C. Kehlet, Los Altos; Michael G. Lavelle, Saratoga; Michael F. Deering, Los Altos, all of Calif.

[73] Assignee: Sun Microsystems, inc., Palo Alto, Calif.

[21] Appl. No.: 08/992,196

[22] Filed: Dec. 17, 1997

[51] Int. Cl.⁶ .................................................. G06F 15/16
[52] U.S. Cl. ........................ 345/502; 345/503; 345/505; 345/508; 345/1; 395/553
[58] Field of Search ................... 345/502, 503, 345/505, 508, 213, 1; 395/550, 551, 553

[56] References Cited

U.S. PATENT DOCUMENTS

| | | | |
|---|---|---|---|
| 4,908,614 | 3/1990 | Yamagishi | 345/508 |
| 5,275,565 | 1/1994 | Moncrief | 434/29 |
| 5,374,940 | 12/1994 | Corio | 345/1 |
| 5,546,530 | 8/1996 | Grimaud et al. | 345/502 |
| 5,765,009 | 6/1998 | Ishizaka | 395/800.16 |

*Primary Examiner*—Kee M. Tung
*Assistant Examiner*—Sy D. Luu
*Attorney, Agent, or Firm*—Conley, Rose & Tayon; B. Noel Kivlin

[57] ABSTRACT

A multi-display video system for ensuring the proper synchronization of scene switching. Before each display switches to pixel data corresponding to the next scene to be rendered, new pixel data is written into a currently unused bank of frame buffer memory within a corresponding graphics accelerator. When each graphics accelerator in the video system has completed writing the new pixel data to its respective frame buffer, the scene switch may take place. Each graphics accelerator is configured to display an image corresponding to the next scene in response to the indicator output signal indicating that the pixel data updates for all graphics accelerators are complete.

31 Claims, 6 Drawing Sheets

SCENE SYNCHRONIZATION OF MULTIPLE COMPUTER DISPLAYS

BACKGROUND OF THE INVENTION

1. Field of the Invention

The present invention relates to the field of computer graphics, and, more specifically, to a method and apparatus for synchronizing the concurrent display of computer-generated scenes on multiple video display devices.

2. Description of the Related Art

One of the primary goals of many computer graphics systems is that of visual realism. The quest for visual realism involves many facets, including modeling the complex ways in which light interacts with objects in the real world. Understandably, there are many limitations on the amount of realism that current graphics systems are capable of producing. Many of the recent advances in computer graphics systems are attempts to overcome or lessen some of the fundamental limitations of computer graphics.

One such limitation is that images representing three-dimensional objects in the real world are ultimately rendered on a two-dimensional screen. Although such techniques as perspective viewing provide depth cues to the human eye, graphics system capable of stereo display have been developed. Stereo systems render two or more views of an object on a display device. The viewer, with the aid of specialized glasses, ultimately sees a single fused image. This conveys a powerful depth cue to the human eye, thus increasing the realism of the viewed object.

Another limitation of computer graphics is that a display device typically only subtends a relatively small portion of the viewer's field of vision. For certain applications, then, even a very realistic image may not produce the effect that the viewer is actually immersed in the scene. This is particularly true of simulation environments in which it is necessary to generate images for the entire range of the viewer's field of vision.

This broad field of vision is essential in an application such as a flight simulator. Accordingly, flight simulator systems are typically designed using multiple video display devices, with each display device displaying a different view of a particular scene. Such a system is shown in FIG. 1.

Figure 1:
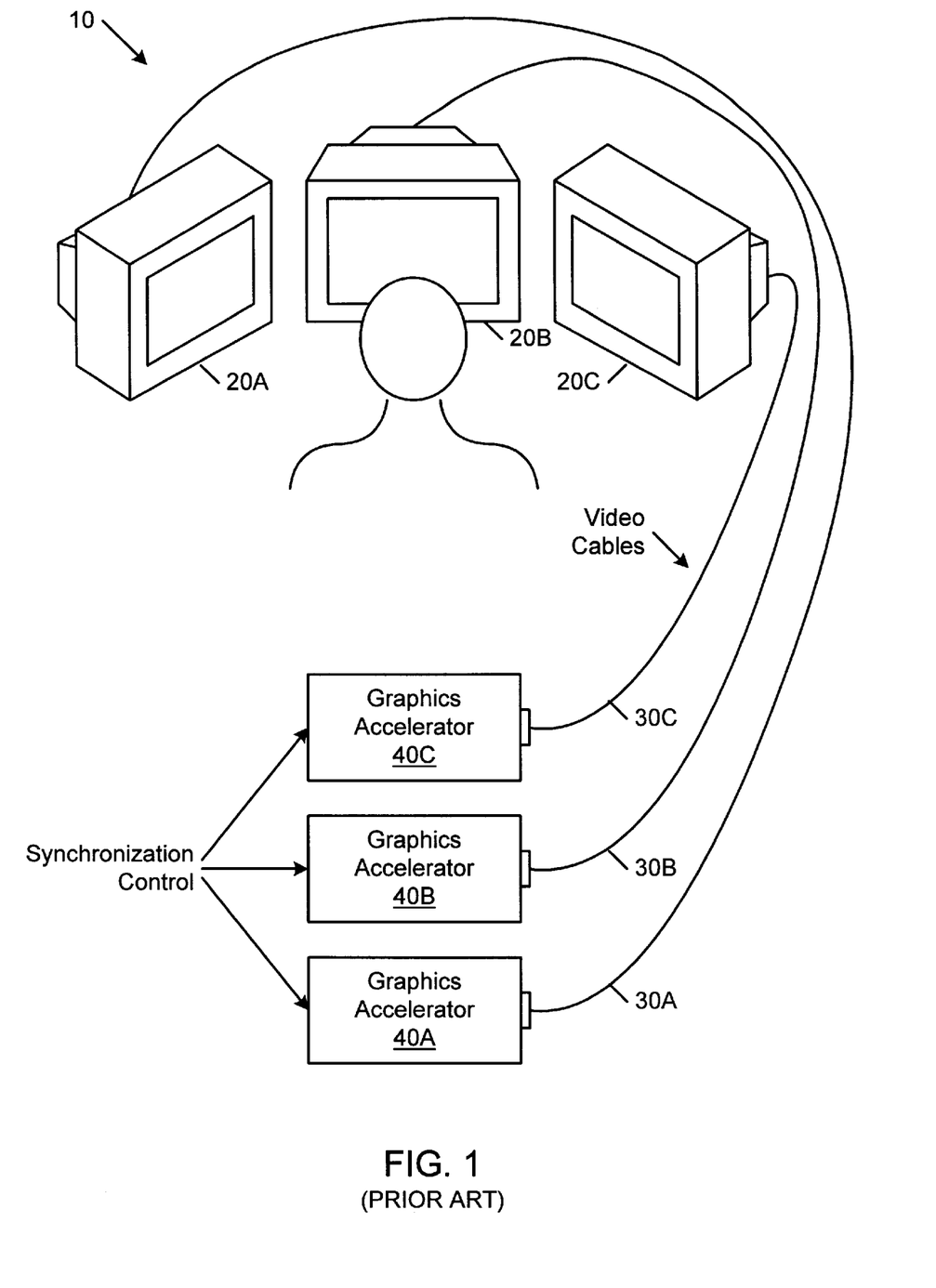
FIG. 1 depicts a prior art simulation environment with multiple displays.

FIG. 1 depicts a simulation environment 10. Simulation environment 10 includes display devices 20A–C (referred to collectively as display devices 20) arranged about a viewer. Each of display devices 20 is designed to display a different view of a given scene. In the case of a flight simulator system, display 20A may represent the view out of the left side of the cockpit window, display 20B may represent the forward view, and display 20C may represent the view out of the right side of the cockpit window. Various other arrangements of display devices 20 are possible in other embodiments.

Simulation environment 10 further includes graphics accelerators 40A–C and video cables 30A–C. Each of graphics accelerators 40 is coupled to a respective one of display devices 20 by a corresponding one of video cables 30. Each view of the given scene is drawn (or "rendered") by a dedicated graphics accelerator 40 on one of display devices 20.

An important attribute of a multi-display system such as simulation environment 10 is that the displays be synchronized during window updates. A window update occurs in simulation environment 10 when all displays are to switch to displaying a new graphical image corresponding to the next scene. Consider the case of a flight simulator program which is displaying a landscape on display devices 20. If the flight simulator program is about to change the scene (to display an explosion, for example), each graphics accelerator 40 begins converting pixel data corresponding to the next scene to a video output signal on one of video cables 30. Each corresponding display device 20 displays a view of the next scene according to the new video signal which is received. If graphics accelerators 40 are not synchronized when beginning generation of the new video signal corresponding to the next scene, undesirable visual effects may result. For example, if the explosion in the next scene is supposed to occur to the left of the cockpit, the explosion should not first be seen in display device 20C. This may occur in systems which lack proper synchronization.

One method utilized by prior art systems to achieve synchronization is concurrently drawing the same scene using two or more viewpoints. Typically, software performs multiple passes of drawing the same scene, with the pixel data from each vantage point written to different portions of display memory (commonly referred to as frame buffer memory). When all views have been written into frame buffer memory, the controlling hardware or software issues a command or signal to switch the scene shown on the various displays.

Another approach is to use parallel systems (each with independent hardware and software) to concurrently render the various images for each display. Networking is used to communicate between systems that drawing has completed for a particular scene. When all scenes are complete, each system switches its respective display.

Both of these approaches are subject to race conditions, however. For example, a command issued by controlling hardware or software to switch to the next scene may be executed during one vertical scan for one display, and during the next vertical scan for a different display. This leads to visual artifacts, which are particularly undesirable in high-performance applications such as flight simulators.

A computer system which ensures the synchronization of multiple computer displays during scene switching would therefore be desirable.

SUMMARY OF THE INVENTION

The problems outlined above are in large part solved by a multi-display video system in accordance with the present invention. In one embodiment, a multi-display video system is provided for ensuring the proper synchronization of scene switching. The video system includes a plurality of display devices, each for rendering a particular view of a given scene. Each of the plurality of display devices is coupled to receive a video output signal from a corresponding one of a plurality of graphics accelerators. Each of the plurality of graphics accelerators includes a frame buffer memory unit, each of which includes a first frame buffer memory bank and a second frame buffer memory bank for storing pixel data. Each of the plurality of graphics accelerators further includes a digital-to-analog converter (DAC) unit coupled to the frame buffer memory unit. The DAC unit is configured to select the pixel data of either the first or second frame buffer memory bank from which to generate a corresponding video output signal to the corresponding display device.

Before each of the plurality of graphics accelerators can switch to pixel data corresponding to the next scene to be rendered, the new pixel data is written into a bank of frame buffer memory. When all of the graphics accelerators have completed writing the new pixel data to their respective frame buffers, the scene switch may then take place. The video system is thus configured to inhibit this scene switch until all new pixel data has been transferred into the respective frame buffer memory banks.

Each DAC unit is configured to assert a local in-progress signal during the pixel data update for that particular graphics accelerator. (Each local in-progress signal is de-asserted when the pixel data update is complete). Each of the plurality of graphics accelerators further includes a latch circuit that receives the in-progress signal from the corresponding DAC unit. The latch circuit is configured to latch the in-progress signal as a latch output signal for a first time period beginning at a first point in time.

The latch output signal from each graphics accelerator is coupled to an indicator circuit, which conveys a indicator output signal indicative of whether any of the plurality of graphics accelerators was still performing the pixel data update at the first point in time. Each DAC unit is further configured to sample the indicator output signal at a second point in time subsequent to the first point in time. Each of the plurality of graphics accelerators is configured to render an image corresponding to the next scene in response to the indicator output signal indicating that the pixel data updates for all of the plurality of graphics accelerators are complete.

In one embodiment, the first point in time occurs on the rising edge of a first reference signal, and the second point in time occurs on the rising edge of a second reference signal. The time difference $T_s$ between the rising edge of the first reference signal and the rising edge of the second reference signal satisfies the inequality $T_s > T_{pd} + T_{fs}$. $T_{pd}$ is the maximum propagation delay between a change in the indicator output signal being detected at one graphics accelerator and all others, while $T_{fs}$ is the time difference between the first reference signal being asserted at one graphics accelerator and all others. In one embodiment, the vertical blanking signal is used as the first reference signal and the vertical sync signal is used as the second reference signal. Since these signals are already used by the DAC units for video timing, scene synchronization may thus be achieved without generating additional reference signals.

By latching the local in-progress signal of each DAC unit and sampling an appropriate amount of time later, the same indicator output signal is obtained by each DAC unit. At each sample point, then, the same determination (scene switch/no scene switch) is made by all graphics accelerators concurrently. The video display system may thus perform the scene switch simultaneously for each of the plurality of display devices, advantageously improving the quality of the images rendered by the video system.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
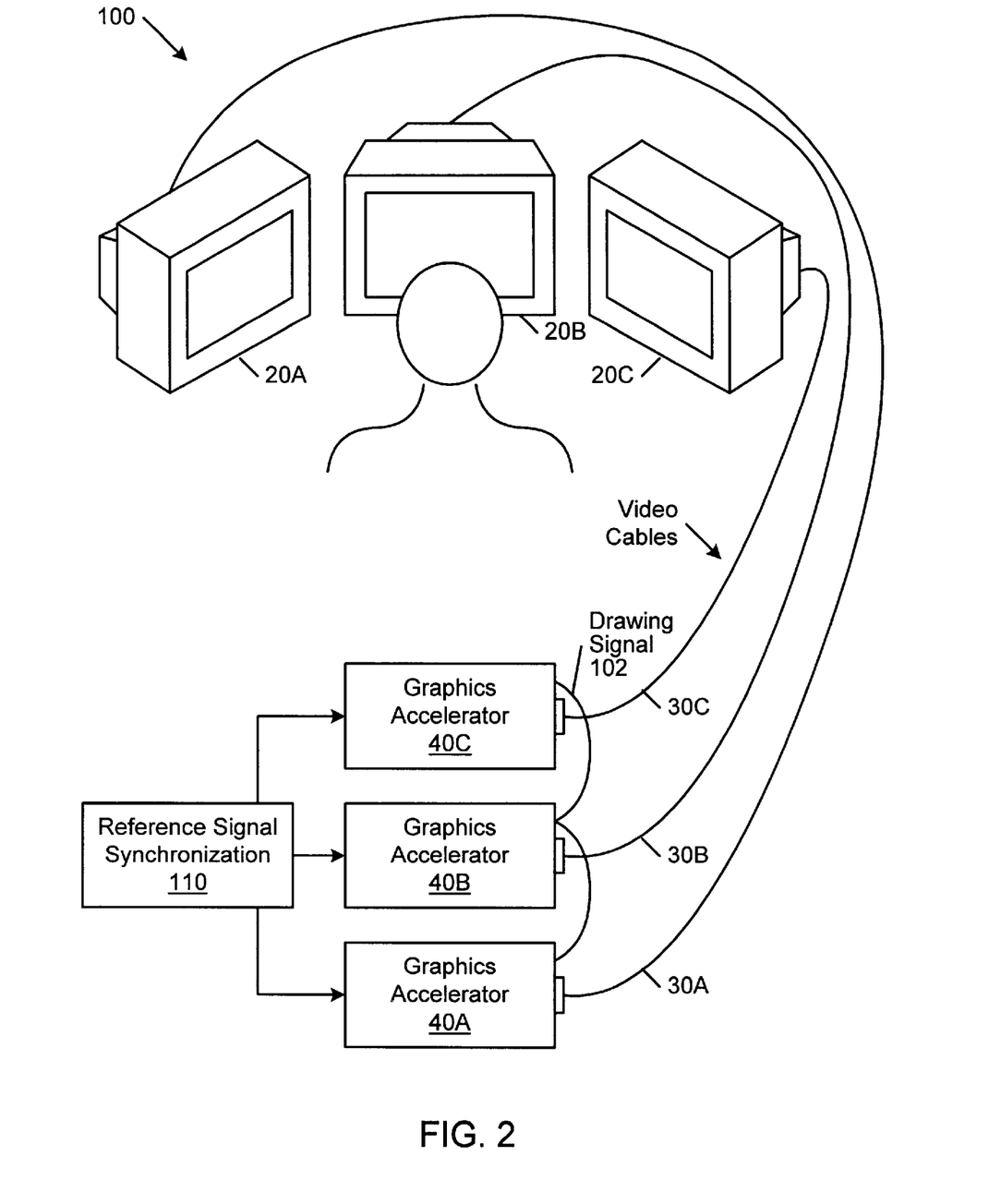
FIG. 2 depicts one embodiment of a multi-display video system according to the present invention.

Turning now to FIG. 2, a simulation environment 100 is shown according to one embodiment of the present invention. Simulation environment 100 is similar to simulation environment 10 described above. Simulation environment 100 includes a plurality of display devices 20A–C coupled to respective ones of a plurality of graphics accelerators 40A–C by respective ones of a plurality of video cables 30A–C. Display devices 20 are typically arranged such that the viewer's field of vision is covered, but the displays may also be configured in any number of alternate arrangements.

In one embodiment, each graphics accelerator 40 receives geometry input data from a host CPU (not shown in FIG. 2 for convenience). The front end of the pipeline of graphics accelerator 40 then performs geometry processing operations on the received input data, producing modified geometric primitive data. These primitives are typically in the form of triangles. Common geometry processing operations include model space to screen space transformation, clipping, and lighting. The back end of the pipeline of graphics accelerator 40 then performs rendering operations, in which pixel values are manipulated and ultimately written to a frame buffer memory. A digital-to-analog converter (DAC) then converts this pixel information to an analog video signal to be conveyed to a respective display device 20 via one of video cables 30.

In an alternate embodiment, the host CPU performs the geometry processing operations described above. The resultant modified geometric primitives are then conveyed to graphics accelerator 40. In this embodiment, then, graphics accelerator only includes the hardware for the rendering portion of the graphics pipeline.

In simulation environment 100, graphics accelerators 40 may be installed in the same or different computer systems. Within each computer system, one or more processor units may provide graphics commands and data to the corresponding graphics accelerators 40 located within the system. In one embodiment, then, a single host CPU may provide graphics input data to all of graphics accelerators 40. Alternately, simulation environment 100 may include parallel computer systems, each with a host CPU and one or more of graphics accelerators 40.

As shown, each graphics accelerator 40 is coupled to a reference signal synchronization unit 110. Unit 110 is used to provide synchronization between the video timing signals (e.g., VSYNC, VBLANK, etc.) for each of display devices 20. In one embodiment, the various display devices 20 may be genlocked. Genlocking is a feature which synchronizes the video timing of two or more displays to within a pixel. This means the pixel data and SYNC signals of each of graphics accelerators 40 are closely aligned. Genlock is typically accomplished by clock control and vertical reset circuitry on a slave card (for each graphics accelerator 40) that references a master SYNC signal. The disadvantage of genlocking displays, however, is that this procedure is typically expensive to implement.

Another method for video timing synchronization is "field-locking" of displays. The advantage of field-locking over genlocking is that field-locking is simpler and less expensive to implement (since no pixel clock is needed). Each graphics accelerator 40 has its own video clock source and corresponding slave card. A master SYNC source is used and each slave card resets its vertical counter when VSYNC is seen and the current line is completed. Thus, for each monitor, the horizontal rate is constant. At most, the displays may be 1 line out of sync with another display, which is an acceptable deviation in many applications.

Field-locking is described in greater detail in the currently co-pending application Ser. No. 08/914,973 entitled "Video Frame Synchronization of Independent Timing Generators for Frame Buffers in a Master-Slave Configuration", filed Aug. 20, 1997 and assigned to the assignee of this application.

As shown, each graphics accelerator 40 within simulation environment 100 is coupled by a drawing signal 102. As will be described in greater detail below, drawing signal 102 is used to communicate the collective state of each graphics accelerator 40 relative to an impending scene switch. This signal 102 is used along with reference signal synchronization unit 110 in order to ensure precise synchronization between all of display devices 20.

Figure 3:
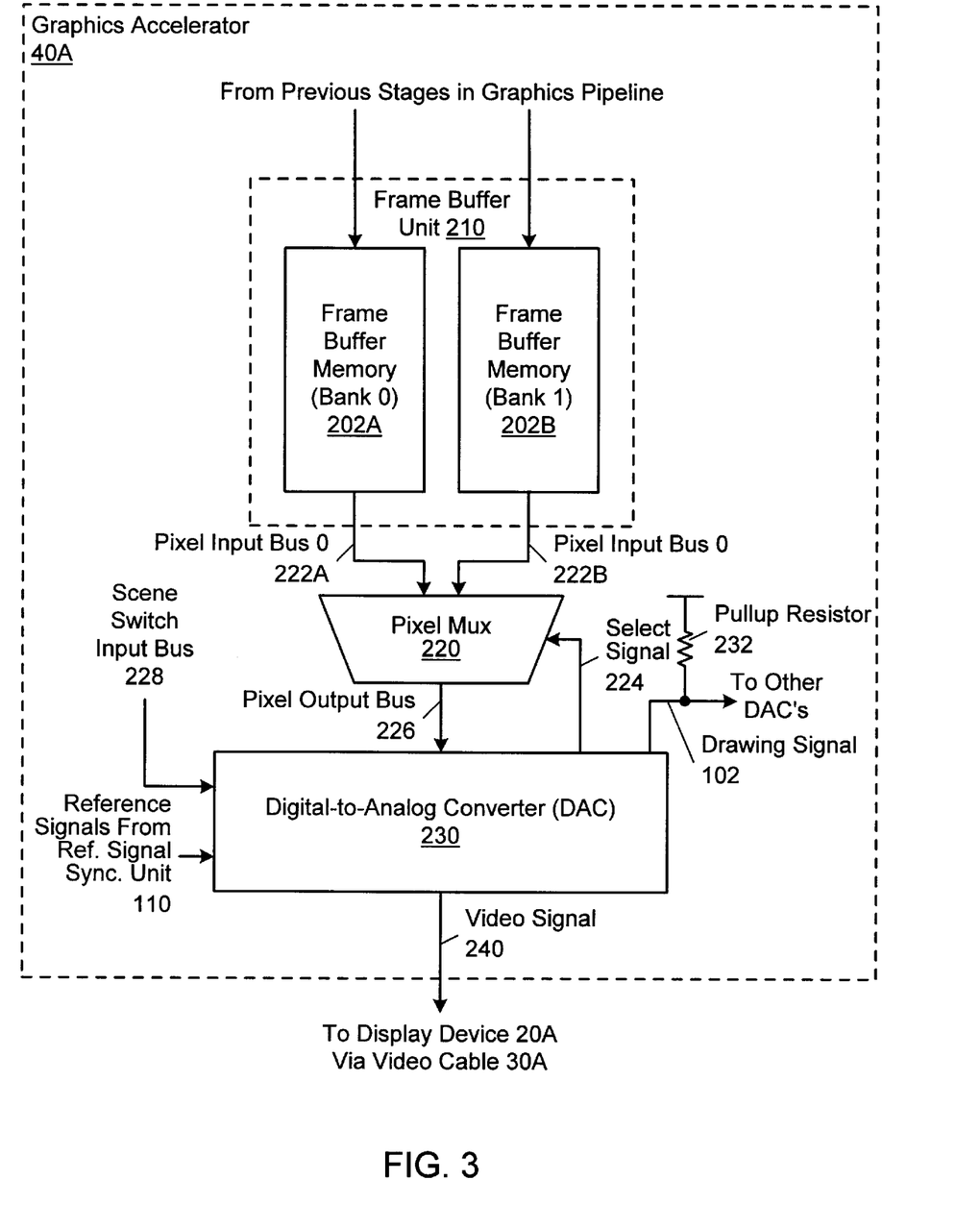
FIG. 3 is a block diagram depicting the interface between the frame buffer and the digital-to-analog converter according to one embodiment of the present invention.

Turning now to FIG. 3, a block diagram of a portion of graphics accelerator 40A is depicted according to one embodiment of the invention. Specifically, FIG. 3 illustrates the interface between a frame buffer unit 210 and a digital-to-analog converter (DAC) unit 230. Graphics accelerator 40B and 40C also include similar circuitry, which is not included in FIG. 3 for simplicity and clarity.

As stated above, graphics accelerator 40A includes frame buffer unit 210, which includes frame buffer memory bank 0 (denoted in FIG. 3 with reference numeral 202A) and frame buffer memory bank 1 (202B). Memory banks 202 receive pixel data from previous stages of the graphics pipeline. Banks 202A–B convey output pixel data to a pixel select multiplexer 220 on pixel input bus 0 (222A) and pixel input bus 1 (222B). DAC unit 230 provides a select signal 224 to multiplexer 220 to select which pixel data is conveyed to DAC unit 230 on pixel output bus 226.

DAC unit 230 additionally receives a scene switch input bus 228 and reference signals from reference signal synchronization unit 110. Although these inputs are used to help trigger the scene switch operation, a scene switch input bus coupled to each graphics accelerator 40 alone is not sufficient to synchronize the double buffer switch operation described below. This switch operation is synchronous with video, while assertions on bus 228 are inherently asynchronous with video. Accordingly, additional hardware is used as described below. For example, even if all graphics accelerator 40 were signaled (via a common scene switch input bus) to perform a buffer switch concurrently, each graphics accelerator 40 might complete the update operation at a different time depending on the varying processing loads on each accelerator.

In response to receiving inputs 228 and 110, DAC unit 230 generates select signal 224 and drawing signal 102. Drawing signal 102 is also coupled to respective DAC units in graphics accelerator 40B and 40C. Additionally, drawing signal 102 is coupled to a logic high reference voltage via a pullup element 232. As output, DAC unit 230 generates a video signal 240 in response to the pixel data received on pixel output bus 226. Video signal 240 is conveyed to display device 20A via video cable 30A.

In one embodiment, each of memory banks 202 includes sufficient capacity to store data for each pixel in a complete frame of display device 20A. This configuration allows double-buffering of frame buffer memory. While an image is displayed from data in bank 202A, for example, pixel data for the next window update may be written into bank 202B. When the new pixel data is completely written to bank 202B, DAC unit 230 switches to receive data from this bank, producing a video signal 240 which corresponds to a new image on display device 20A. Scene synchronization involves ensuring that the buffer switch occurs simultaneously in each of graphics accelerators 40. In one embodiment, this synchronization is effectuated by use of drawing signal 102, which is coupled to each DAC unit 230.

When a scene switch is desired, an indication on each respective scene switch input bus 228 indicates to each DAC unit 230 that a scene switch is desired. The input on bus 228 sets an in-progress signal within DAC unit 230 indicating that a window update is being pursued for this particular graphics accelerator 40. This in-progress signal is described in greater detail with reference to FIG. 5.

When DAC unit 230 sets the in-progress signal, this has the effect of pulling drawing signal 102 to a logic low state. The circuitry which performs this operation is shown in more detail with reference to FIG. 5. When drawing signal 102 is in a logic low state, this disables the buffer switch operation. With scene switching is disabled, graphics accelerator 40A is then free to write the pixel data for the next scene to the memory bank 202 that is not currently in use. For example, if pixel data from bank 202A is currently being rendered on display device 20A, graphics accelerator 40A writes the new pixel data for the next scene to bank 202B.

When a particular DAC unit 230 completes updating its frame buffer memory unit 210, an input is received on bus 228 which resets the in-progress signal. At this point, that particular DAC unit 230 is no longer pulling down drawing signal 102. Drawing signal 102, however, remains in a logic low state as long as at least one DAC unit 230 in one of graphics accelerators 40 still performing the update of the new pixel data.

When each graphics accelerator 40 completes the updating of frame buffer unit 210 and each in-progress signal is reset, drawing signal 102 returns to a logic high state. A scene switch may now be performed within simulation environment 100 for each graphics accelerator 40. If each DAC unit 230 detects the de-assertion of drawing signal 102 at different times, the new video signals generated by the DAC units 230 for the next scene are generated at different times. Accordingly, display devices 20A display the next scene at different times, and synchronization is not achieved.

To avoid this problem, each DAC unit 230 periodically disables the in-progress signal from changing for a certain length of time. This also effectively disables changes to drawing signal 102 during this time period. A specified time period later (with changes to signal 102 still disabled), each DAC unit 230 samples the status of drawing signal 102. This specified time period is long enough to ensure the proper value of drawing signal 102 can propagate to each graphics accelerator 40.

When a scene switch is being pursued and DAC unit 230 detects drawing signal 102 to be in a logic high state, each graphics accelerator 40 performs the scene switch. In the embodiment shown in FIG. 3, this operation includes toggling select signal 224 to multiplexer 220. Toggling select signal 224 causes pixel output bus 226 to convey pixel data from the bank 202 not previously in use. As will be shown below, this frame buffer memory swap advantageously occurs simultaneously in each of graphics accelerators 40, thus synchronizing the scene switch operation.

While drawing signal 102 is described herein as being active low, it is noted that in other embodiments drawing signal 102 may be active high.

Figure 4:
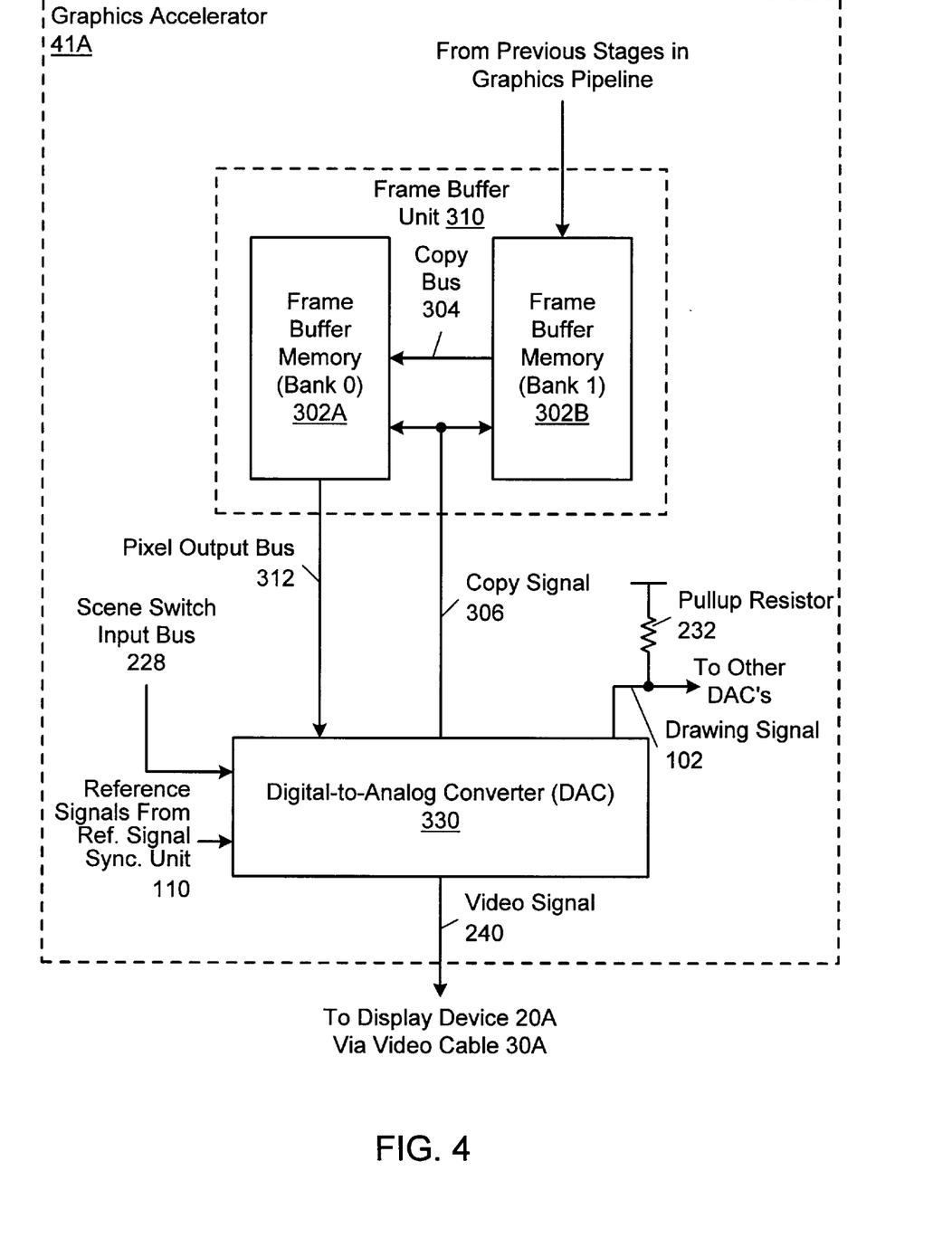
FIG. 4 is a block diagram depicting an alternate embodiment of the interface between the frame buffer and the digital-to-analog converter according to the present invention.

Turning now to FIG. 4, a block diagram of a portion of a graphics accelerator 41A is depicted. Like FIG. 3, FIG. 4 depicts the frame buffer-DAC unit interface. Graphics accelerator 41A is similar in function to graphics accelerator 40A as described above, but differs in the manner in which double buffering is implemented. Although graphics accelerator 41A includes many similar logic blocks as graphics accelerator 40A, these logic blocks are numbered differently to indicate slight differences in functionality.

Graphics accelerator 41A includes a frame buffer unit 310, which includes frame buffer memory banks 302A and 302B. Bank 302B receives pixel data from previous graphics pipeline stages, and is coupled to bank 302A via a copy bus 304. Bank 302A provides pixel data to a DAC unit 330 over pixel output bus 312. DAC unit 330 receives various inputs relating to scene switch operations on scene switch input bus 228, as well as reference signals from reference signal synchronization unit 110. DAC unit 330 signals a copy operation from bank 302B to 302A by asserting a copy signal 306. In similar fashion to graphics accelerator 40A, graphics accelerator 41A conveys drawing signal 102 and video signal 240 as outputs of DAC unit 330.

Graphics accelerator 41A operates similarly to graphics accelerator 40A with the exception of the manner in which the window update occurs. In graphics accelerator 40A, banks 202A and 202B convey pixel data to pixel multiplexer 220. DAC unit 230 then provides select signal 224 to select between the two inputs. The frame buffer swap (and hence, the scene switch) occurs simply by toggling select signal 224 to start selecting pixel data from the frame buffer memory bank 202 not currently in use.

DAC unit 330 in graphics accelerator 41A, by contrast, only receives data from frame buffer memory bank 302A. Bank 302A is thus always the "active" bank with relation to what is displayed on display device 20A. Frame buffer memory bank 302B, then, is the "shadow" frame buffer memory bank. Pixel data from previous graphics pipeline stages is thus written into bank 302B while an image is rendered on display device 20A which corresponds to the pixel data in frame buffer memory bank 302A. When DAC unit 330 determines (based on the state of drawing signal 102) that the frame buffer switch is to occur, copy signal 306 is asserted to both banks 302A and 302B. Frame buffer unit 310 then performs a copy operation which transfers the pixel data in bank 302B to bank 302A over copy bus 304. In one embodiment, this copy occurs during the VBLANK interval of display device 20A. Thus, by the time the VBLANK interval is over, the updated pixel data is stored in bank 302A. DAC unit 330 may then generate a corresponding video output signal 240 to display device 20A in order to draw the next frame.

Graphics accelerators 40A and 41A shown in FIGS. 3 and 4 implement double buffering of frame buffer memory in two different ways. Other methods of double buffering the frame buffer memory are possible in other embodiments.

Figure 5:
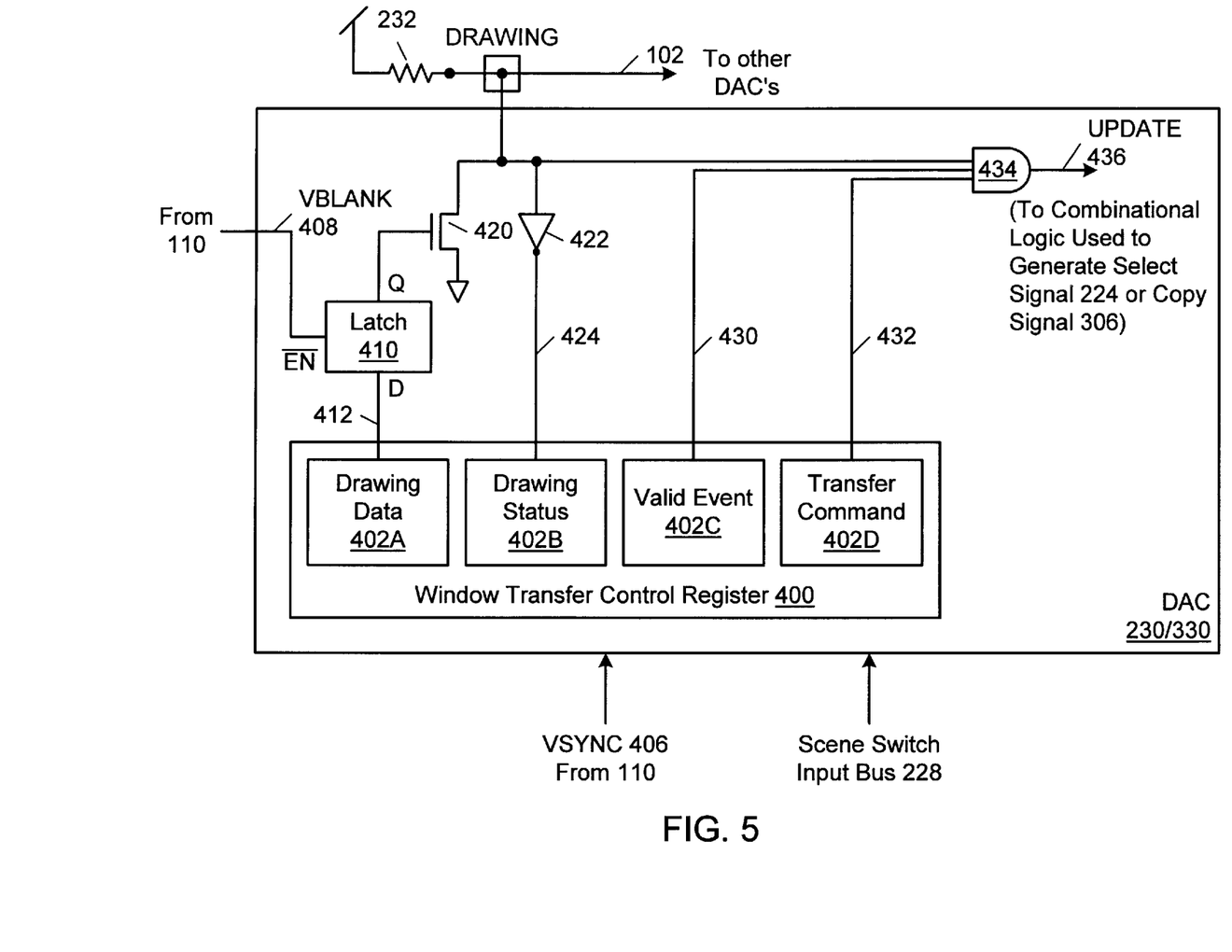
FIG. 5 is a block diagram of a portion of the digital-to-analog converter according to one embodiment of the present invention.

Turning now to FIG. 5, a block diagram of a portion of DAC unit 230 is depicted in one embodiment of the invention. The circuitry shown in FIG. 5 is also applicable to DAC unit 330 shown in FIG. 4. FIG. 5 illustrates the portion of DAC unit 230 which allows synchronization of the frame buffer memory swap within frame buffer unit 210 (or 310) of each graphics accelerator 40.

As illustrated, DAC unit 230 receives two reference signals, VSYNC signal 406 and VBLANK signal 408, from reference signal synchronization unit 110. These video timing signals may be synchronized by various means as described above. DAC unit 230 also receives scene switch input bus 228 as input. As will be described below, these inputs are used to set various indications in a window transfer control register 400. In one embodiment, register 400 includes at least four separate storage locations 402. These include, in one embodiment, drawing data 402A, drawing status 402B, valid event 402C, and transfer command 402D. These storage locations 402 may be either a single bit value or multiple bits depending on the particular embodiment.

Drawing data storage location 402A is coupled to a latch unit 410 by a drawing data output signal 412. Latch unit 410 conveys a latch output signal 416 to a pulldown transistor 420, and receives VBLANK signal 408 as an enable signal. As shown in FIG. 5, the enable signal of latch unit 410 is indicated as being active low, such that the latch is enabled when VBLANK signal 408 is in an active low state. In a different embodiment, the polarity of the enable signal may be reversed.

Latch output signal 416 is coupled to the drain of a transistor 420. The source and gate of transistor 420 are coupled to ground and drawing signal 102, respectively. In one embodiment, drawing signal 102 is also coupled to an inverter 422, which conveys drawing status input signal 424 to drawing status storage location 402B. Drawing signal 102 is additionally coupled to an AND gate 434.

Register 400 also includes valid event storage location 402C, which is coupled to AND gate 434 via valid event output signal 430. Transfer command storage location 402D is coupled to AND gate 434 via transfer command output signal 432. AND gate 434 correspondingly generates an update signal 436. Update signal 436 is subsequently used to generate either select signal 224 or copy signal 306 which effectuate the memory swap in frame buffer unit 210/310.

When it is desired to perform a synchronized scene switch in simulation environment 100, each DAC unit 230 receives an appropriate value on scene switch input signal 228. This value on bus 228 causes drawing data storage location 402A to be set. This signifies that DAC unit 230 is currently pursuing window changes which need to be synchronized.

Assuming that latch unit 410 is currently enabled (VBLANK signal 410 is low), the setting of drawing data storage location 402A causes drawing data output signal 412 to be asserted. This asserted signal 412 propagates through latch unit 410 to latch output signal 416. When latch output signal 416 is asserted, transistor 420 is enabled, pulling drawing signal 102 to ground. It is noted that when window changes are initiated, each DAC unit 230 in simulation environment 100 may be pulling drawing signal 102 low through a respective transistor 420. Drawing signal 102 is still low, however, if only one DAC unit 230 has drawing data storage location 402A active.

As shown in FIG. 5, drawing status storage location 402B is coupled to drawing signal 102 via inverter 422. Thus, if drawing status storage location 402B is set, this indicates that at least one graphics accelerator 40 is still pursuing window changes. Drawing status storage location 402B being set effectively disables the frame buffer memory switch.

While drawing status storage location 402B is set, each graphics accelerator 40 in simulation environment 100 updates its frame buffer memory to correspond to the next desired scene. When graphics accelerator 40A, for example, completes these updates, drawing data storage location 402A is reset and transfer command storage location 402D is set via scene switch input bus 228. Assuming again that latch unit 410 is enabled, this change in storage location 402A propagates through latch unit 410 to disable transistor 420. As long as one graphics accelerator 40 is still updating its frame buffer, however, drawing signal 102 still remains in a logic low state. The setting of transfer command storage location 402D signifies not only that graphics accelerator 40A has completed frame buffer updates, but also that DAC unit 230 is ready to perform the buffer swap. This swap may then be performed when DAC unit 230 detects that drawing signal 102 returns to a logic high state.

In order to avoid the race conditions that are present in prior art, however, DAC unit 230 samples drawing signal 102 in an orderly fashion. In order to perform this sampling of drawing signal 102, updates to signal 102 are periodically disabled for a specified period of time. In the embodiment shown in FIG. 5, latch unit 410 is disabled whenever VBLANK signal 408 is active. This causes latch output signal 416 to be latched at a given state while VBLANK signal is asserted.

A given time interval later (with VBLANK signal 408 still asserted), VSYNC signal 406 is asserted. This causes valid event storage location 402C to be set, causing a corresponding assertion of valid event output signal 430 as well. In one embodiment, the scene switch occurs in a given DAC unit 230 if three conditions are present: 1) the given DAC unit 230 has completed its local frame buffer update (signified by location 402D being set), 2) all other DAC units 230 have completed their frame buffer updates (signified by drawing signal 102 being in a logic high state), and 3) VSYNC signal 406 is asserted (signified by valid event storage location 402C being set). When these conditions are met, AND gate 434 asserts update signal 436.

In the various double buffering implementations described above, update signal 436 is used differently. In graphics accelerator 40A, update signal 436 is conveyed to combinatorial logic which toggles the current state of select signal 224, effectively selecting pixel data from the non-active bank through multiplexer 220. In graphics accelerator 41A, update signal 436 is conveyed to frame buffer unit 310 as copy signal 306, causing pixel data to be written from bank 302B to bank 302A.

VBLANK signal 408 and VSYNC signal 406 are video timing signal used for generating video output signal 240 to display device 20A. VBLANK signal 408 is the vertical blanking interval which tells display device 20A not to display the electron beam as the electron gun sweeps from the bottom to the top of the screen. VSYNC signal 406 is that portion of the video signal which indicates where the top of the screen is.

Because VBLANK signal 408 and VSYNC signal 406 are already utilized by DAC unit 230, the use of these signals to sample drawing pin 102 obviates the need to generate additional reference signals. In an alternate embodiment, however, a first reference signal (analogous to VBLANK signal 408) and a second reference signal (analogous to VSYNC signal 406) may be generated and used to sample drawing signal 102 instead. The timing between the assertion of VBLANK signal 408 (or, more generally, a first reference signal) and the assertion of VSYNC signal 406 (or second reference signal) is described more specifically with reference to FIG. 6A.

Figure 6A:
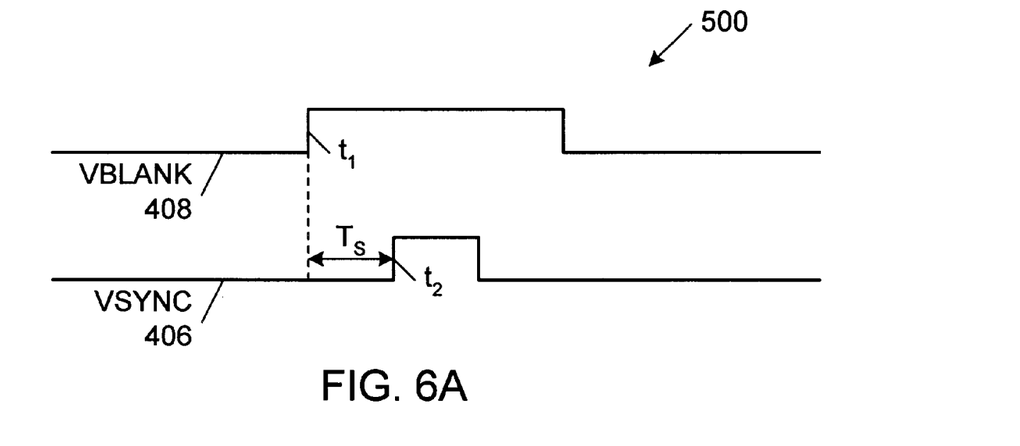
FIG. 6A is a timing diagram illustrating the relationship between the assertion of the VBLANK and VSYNC signals in one embodiment of the present invention.

Turning now to FIG. 6A, a timing diagram 500 is depicted which illustrates the relationship between the assertion of VBLANK signal 408 and VSYNC signal 406. As stated above, this timing diagram is applicable to any two reference signals that may be used to sample the state of drawing signal 102 in alternate embodiments.

As shown in FIG. 6A, VBLANK signal 408 is asserted at time $t_1$. Subsequent to time $t_1$, VSYNC signal 406 is asserted at time $t_2$. The difference between the assertion of VBLANK signal 408 and VSYNC signal 406 is thus $t_1 - t_2$, also represented as $T_s$. In order to properly sample drawing signal 102 at time $t_2$, the interval $T_s$ satisfies the following inequality:

$$T_s > T_{pd} + T_{fs}. \quad (1)$$

In equation (1), $T_{pd}$ represents the maximum propagation delay of drawing signal 102 between different ones of graphics accelerators 40. That is, due to propagation delay, a given change in drawing signal 102 arrives at each DAC unit 230 at a different time. $T_{pd}$ is equal to the maximum difference between these different times. The quantity $T_{fs}$ in equation (1) represents the maximum time difference between the start of VBLANK signal 408 of one graphics accelerator 40 and the start of VBLANK signal 408 of all other graphics accelerators 40. (In an embodiment in which VBLANK signal 408 and VSYNC signal 406 are synchronized in a common manner, $T_{fs}$ also represents the maximum time difference between the start of VSYNC signal 406 on one of graphics accelerators 40 and the start of VSYNC signal 406 on all other graphics accelerators 40.) For genlocked displays, $T_{fs}$ may be very small (less than 100 nanoseconds). For field-locked displays, $T_{fs}$ may be as great as the scan time for one horizontal line (12 $\mu$s in one embodiment). The time interval $T_s$ is further clarified with reference to FIG. 6B below. It is noted that VBLANK signal 408 remains asserted until VSYNC signal 406 is asserted in order to assure the integrity of the sampling of drawing signal 102. In one embodiment, VBLANK signal 408 remains asserted until the scene switch operation is complete.

Figure 6B:
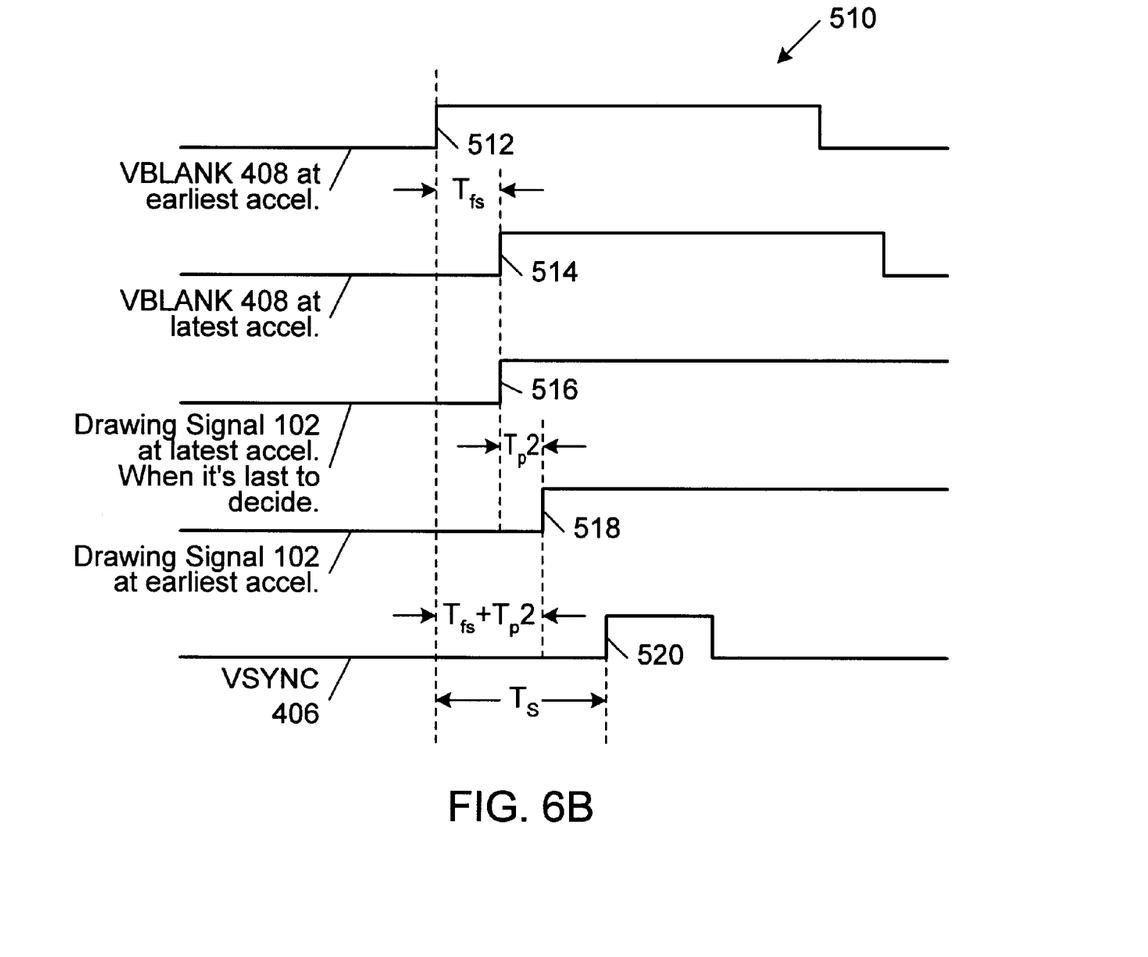
FIG. 6B is a timing diagram illustrating the minimum time interval between the assertion of the VBLANK and VSYNC signals according to one embodiment of the present invention.

Turning now to FIG. 6B, a timing diagram 510 is depicted which illustrates the inequality in equation (1). Timing diagram 510 shows a first assertion of VBLANK signal 408 (denoted by reference numeral 512 in FIG. 6B), and a last assertion of VBLANK signal 408 on a different graphics accelerator 40 (denoted by numeral 514). The maximum time difference between these two assertions is $T_{fs}$, as described above. Up until the point in time where VBLANK signal 408 is asserted for a particular graphics accelerator 40, that particular accelerator may change the state of drawing signal 102. This change in state of drawing signal 102 then takes a time delay $T_{pd}$ to propagate to all DAC units 230. For example, consider a change in drawing signal 102 at edge 516 which corresponds to the latest accelerator (the accelerator which corresponds to the VBLANK assertion at edge 514). The change in drawing signal 102 which occurs at edge 516 is not seen at the earliest graphics accelerator (the accelerator which corresponds to the VBLANK assertion at edge 512) until a time delay $T_{pd}$ later, at edge 518. At the point in time which corresponds to edge 518, any possible changes to drawing signal 102 are visible at all graphics accelerators. As shown in FIG. 6B, the time difference between edge 512 and edge 518 is given by $T_{pd}+T_{fs}$. At a point in time subsequent to edge 518, therefore, drawing signal 102 may be safely sampled. For example, drawing signal 102 is sampled at edge 520 in FIG. 6B, which occurs a time period $T_s$ after edge 512, where $T_s$ satisfies equation (1) above.

The embodiments of the invention described above relate to the synchronization of the double buffer update operation for multiple display devices. In other embodiments, however, the techniques described above may be used to synchronize other types of operations.

Consider a plurality of processing units coupled by a common indicator signal. Each of the plurality of processing units is to concurrently perform one of a first set of processing tasks followed by one of a second set of processing tasks. If it is desired to synchronize the initiation of processing each of the second set of tasks after all of the first set of processing tasks have been completed, the methods described above may be employed.

When each processing unit commences its respective one of the first set of processing tasks, the processing unit sets a local indication that the task is in progress. This local in-progress signal is coupled to the common indicator signal. If any of the local in-progress signals are set, the common indicator signal is asserted. Each processing unit periodically disables updating of the common indicator signal. A given time period later, each processing unit samples the common indicator signal to determine whether all processing units have completed their tasks.

When a particular processing unit completes its respective one of the first set of processing tasks, the local in-progress signal for that processing unit is reset. When all processing units have reset their local in-progress signal, the common indicator signal will reflect that all processing units have completed their respective tasks. The common indicator signal may then be sampled in the appropriate manner, and the initiation of processing the second set of processing tasks may be synchronized.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a plurality of processing units, wherein each of said plurality of processing units includes a corresponding output signal, and wherein each of said plurality of processing units is configured to assert said corresponding output signal while performing a corresponding one of a first plurality of processing tasks;
    a plurality of latch circuits, wherein each of said plurality of latch circuits is coupled to receive one said corresponding output signal from a respective one of said plurality of processing units as a corresponding latch input signal, and wherein each of said plurality of latch circuits is configured to latch said corresponding latch input signal as a corresponding latch output signal for a first time period beginning at a first point in time;
    an indicator circuit coupled to receive each said corresponding latch output signal from said plurality of latch circuits, wherein said indicator circuit is configured to generate an indicator output signal indicative of whether any of said plurality of processing units was performing said corresponding one of said first plurality of processing tasks at said first point in time;
    and wherein each of said plurality of processing units is configured to sample said indicator output signal at a second point in time subsequent to said first point in time, and wherein each of said plurality of processing units is configured to initiate a corresponding one of a second plurality of processing tasks in response to said indicator output signal indicating that all of said plurality of processing units have completed said corresponding one of said first plurality of tasks by said first point in time.

2. The computer system of claim 1, wherein said each of said plurality of processing units includes a control register which includes a task in-progress bit, wherein said each of said plurality of processing units is configured to set said task in-progress bit when commencing performing of said corresponding one of said first plurality of processing tasks, and wherein said task in-progress bit is conveyed as said corresponding output signal of said each of said plurality of processing units.

3. The computer system of claim 2, wherein said each of said plurality of processing units is configured to reset said task in-progress bit after completing said performing of said corresponding one of said first plurality of processing tasks.

4. The computer system of claim 3, wherein said control register in said each of said plurality of processing units includes a task status bit coupled to said indicator output signal.

5. The computer system of claim 4, wherein said each of said plurality of processing units is configured to read said task status bit from said control register in order to sample said indicator output signal.

6. The computer system of claim 1, wherein said each of said plurality of latch circuits is configured to receive a first reference signal as an enable signal, wherein each of said plurality of latch circuits is configured to convey said corresponding latch input signal as said corresponding latch output signal in response to said enable signal being de-asserted, and wherein said corresponding latch input signal being latched as said corresponding latch output signal for said first time period beginning at said first point in time occurs in response to said enable signal being asserted for said first time period beginning at said first point in time.

7. The computer system of claim 6, wherein said each of said plurality of processing units is configured to sample said indicator output signal at said second point in time in response to a second reference signal being asserted at said second point in time.

8. The computer system of claim 7, wherein said second point in time occurs a time period $T_s$ after said first point in time, wherein $T_s > T_{pd}+T_{fs}$, wherein $T_{pd}$ is a first time period equal to a maximum propagation delay of said indicator output signal from one of said plurality of processing units to remaining ones of said plurality of processing units, and wherein $T_{fs}$ is a second time period equal to a maximum time difference of an assertion of said first reference signal at one of said plurality of latch circuits and a corresponding assertion of said first reference signal at another of said plurality of latch circuits.

9. The computer system of claim 8, wherein said each of said plurality of processing units includes a synchronizing circuit for synchronizing assertions of said first reference signal and said second reference signal at said each of said plurality of latch circuits.

10. The computer system of claim 1, wherein said indicator output signal is de-asserted if each said corresponding latch output signal is de-asserted, and wherein said indicator output signal is asserted if at least one said corresponding latch output signal is asserted.

11. The computer system of claim 1, further comprising a plurality of frame buffer memory units configured to store pixel data, wherein each of said plurality of frame buffer memory units includes a first frame buffer memory bank and a.

12. The computer system of claim 11, wherein each of said plurality of processing units is coupled to a respective one of said plurality of frame buffer units, and wherein said each of said plurality of processing units is configure to select pixel data from either said first frame buffer memory bank or said second frame buffer memory bank.

13. The computer system of claim 12, wherein said each of said plurality of processing units is configured to perform digital-to-analog conversion on said pixel data selected from one of said frame buffer memory units, wherein said digital-to-analog conversion produces a video output signal usable to render a graphical image.

14. The computer system of claim 13, further comprising a plurality of display devices, wherein each of said plurality of display devices is coupled to receive one said video output signal from one of said plurality of processing units, and wherein said each of said plurality of display devices is configured to render said graphical image corresponding to received said video output signal.

15. The computer system of claim 14, wherein said first plurality of processing tasks includes each of said plurality of processing units writing pixel information for a next graphical image to said second frame buffer memory bank.

16. The computer system of claim 15, wherein said video output received by each of said plurality of display devices during said plurality of processing units performing said first plurality of processing tasks corresponds to pixel data in a corresponding said first frame buffer memory bank.

17. The computer system of claim 16, wherein said second plurality of processing tasks includes selecting said pixel information for said next graphical image from a corresponding said second frame buffer memory bank to be conveyed to said respective one of said plurality of processing units for said performing digital-to-analog conversion and generating said video output signal.

18. The computer system of claim 16, wherein said second plurality of processing tasks includes copying said pixel information for said next graphical image from each said second frame buffer memory bank to said corresponding said first frame buffer memory bank, wherein said respective one of said plurality of display devices is configured to receive said pixel information for said next graphical image from said corresponding said first frame buffer memory bank after said copying.

19. A multi-display video system for performing synchronization of scene switching, comprising:
- a plurality of display devices, wherein each of said plurality of display devices is configured to render a particular view of a given scene corresponding to a video input signal;
- a plurality of graphics accelerators corresponding to said plurality of display devices, wherein each of said plurality of graphics accelerators is configured to generate a video output signal received by a corresponding display device as said video input signal, wherein each of said plurality of graphics accelerators includes:
  - a frame buffer memory unit, wherein said frame buffer memory unit includes a first memory bank and a second memory bank for storing pixel data;
  - a digital-to-analog conversion (DAC) unit coupled to said frame buffer memory unit, wherein said DAC unit is configured to select said pixel data from said first memory bank for performing digital-to-analog conversion which generates said video output signal for conveyance to said corresponding display device, and wherein said DAC unit includes an in-progress signal, and wherein said DAC unit is configured to assert said in-progress signal while said corresponding graphics accelerator is writing pixel data for a next display scene to said second memory bank;
  - a latch circuit, wherein said latch circuit is coupled to receive said in-progress signal as a latch input signal, and wherein said latch circuit is configured to latch said latch input signal as a latch output signal for a first time period beginning at a first point in time;
  - an indicator circuit coupled to each of said plurality of graphics accelerators, wherein said indicator circuit is coupled to receive each said latch output signal, and wherein said indicator circuit is configured to generate an indicator output signal indicative of whether any of said plurality of graphics accelerators was performing said writing said pixel data for said next display scene to said second memory bank at said first point in time;
  - and wherein each of said plurality of graphics accelerators is configured to sample said indicator output signal at a second point in time subsequent to said first point in time, and wherein said plurality of graphics accelerators are configured to concurrently cause said pixel data for said next display scene to be conveyed from said second memory bank to said corresponding display device in response to said indicator output signal indicating that all of said plurality of graphics accelerators have completed said writing said pixel data for said next display scene to said second memory bank by said first point in time.

20. The video system of claim 19, wherein said each of said plurality of graphics accelerators includes a control register which includes a drawing in-progress bit, wherein said each of said plurality of graphics accelerators is configured to set said drawing in-progress bit when commencing said writing said pixel data for said next display scene to said second memory bank, and wherein said drawing in-progress bit is conveyed as said in-progress signal by each said DAC unit.

21. The video system of claim 20, wherein said control register in said each of said plurality of graphics accelerators includes a task status bit coupled to said indicator output signal.

22. The video system of claim 21, wherein said each of said plurality of graphics accelerators is configured to read said task status bit from said control register in order to sample said indicator output signal.

23. The video system of claim 19, wherein each said latch circuit is configured to receive a first reference signal as an enable signal, wherein each said latch circuit is configured to convey said latch input signal as said latch output signal in response to said enable signal being de-asserted, and wherein said latch input signal being latched as said latch output signal for said first time period beginning at said first point in time occurs in response to said enable signal being asserted for said first time period beginning at said first point in time.

24. The video system of claim 23, wherein said first reference signal is a vertical blanking signal utilized by each of said plurality of display devices to disable electron beam display between video frames.

25. The video system of claim 23, wherein said each of said plurality of graphics accelerators is configured to sample said indicator output signal at said second point in time in response to a second reference signal being asserted at said second point in time.

26. The video system of claim 25, wherein said second reference signal is a vertical sync signal utilized by each of said plurality of display devices in order to reset electron beam scanning to the top of a display screen.

27. The video system of claim 26, wherein said second point in time occurs a time period $T_s$ after said first point in time, wherein $T_s > T_{pd} + T_{fs}$, wherein $T_{pd}$ is a time period equal to a maximum propagation delay of said indicator output signal from one of said plurality of graphics accelerators to remaining ones of said plurality of graphics accelerators, and wherein $T_{fs}$ is a time period equal to a maximum time difference of an earliest assertion of said first reference signal at one said latch circuit and a last assertion of said first reference signal at another said latch circuit.

28. The video system of claim 27, wherein said each of said plurality of graphics accelerators includes a synchronizing circuit for synchronizing assertions of said first reference signal and said second reference signal.

29. The video system of claim 19, wherein said indicator output signal is configured to be de-asserted if each said latch output signal is de-asserted, and wherein said indicator output signal is configured to be asserted if at least one said latch output signal is asserted.

30. The video system of claim 19, wherein, in response to said indicator output signal indicating that all of said plurality of graphics accelerators have completed said writing said pixel data for said next display scene to said second memory bank by said first point in time, said each of said plurality of graphics accelerators is configured to select said pixel data from said second memory bank to be conveyed to a respective said DAC unit, wherein each said respective said DAC unit is configured to generate a next video output signal corresponding to said next display scene from said pixel data received from said second memory bank.

31. The video system of claim 19, wherein, in response to said indicator output signal indicating that all of said plurality of frame buffer control units have completed said writing said pixel data for said next display scene to said second memory bank by said first point in time, said each of said plurality of graphics accelerators is configured to copy said pixel data for said next display scene from said second memory bank to said first memory bank, wherein said respective one of said plurality of display devices is configured to subsequently receive a next video input signal corresponding to said pixel data for said next display scene from said first memory bank.

* * * * *